United States Patent [19]

Botton et al.

[11] 4,325,923
[45] Apr. 20, 1982

[54] CONTACTING OF PLURAL PHASES

[75] Inventors: Roger Botton, Lyons; Dominique Cosserat, Saint Priest, both of France

[73] Assignee: Rhone-Poulenc Industries, Paris, France

[21] Appl. No.: 155,119

[22] Filed: May 30, 1980

Related U.S. Application Data

[63] Continuation of Ser. No. 60,889, Jul. 26, 1979, abandoned.

[30] Foreign Application Priority Data

Jul. 26, 1978 [FR] France .................................. 78 22094

[51] Int. Cl.³ ............................................. B01D 53/34
[52] U.S. Cl. .................................... 423/234; 423/210; 423/235; 423/240; 423/242; 423/394; 423/659; 261/122; 261/DIG. 75; 422/168
[58] Field of Search ............... 423/210, 234, 393, 394, 423/240, 235, 659, 242; 261/DIG. 75, 122

[56] References Cited

U.S. PATENT DOCUMENTS 2,747,962  5/1956  Heitz et al. ...................... 423/236 X
3,472,620  10/1969  Riga ..................................... 423/393
3,832,719  9/1974  Kuerten et al. ............. 261/DIG. 75

Primary Examiner—Earl C. Thomas
Attorney, Agent, or Firm—Burns, Doane, Swecker & Mathis

[57] ABSTRACT

Intimate and efficient contacting of plural, physically disparate phases, e.g., a gas and a liquid, is achieved by contacting the phases cocurrently in a column. The gas phase is introduced at a velocity between its phase transition inversion point (T) and multiple critical point ($M_c$) velocities, which velocity is sufficient to create a dispersion of the second phase, i.e., the liquid phase, in the gas and thereby establish at most the following zones, from bottom to top, in the column: a bottom zone of constant liquid concentration designated the emulsion zone, a zone of decreasing liquid concentration, and a zone of constant liquid concentration wherein the liquid exists in the form of droplets. The feed velocity of the liquid is adjusted accordingly to provide a mass liquid concentration value in the emulsion that is between the mass liquid concentration value transition inversion point and multiple critical point values.

10 Claims, 4 Drawing Figures

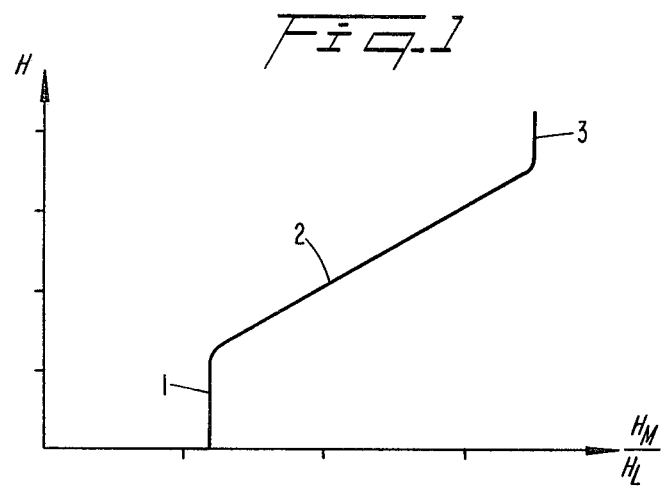
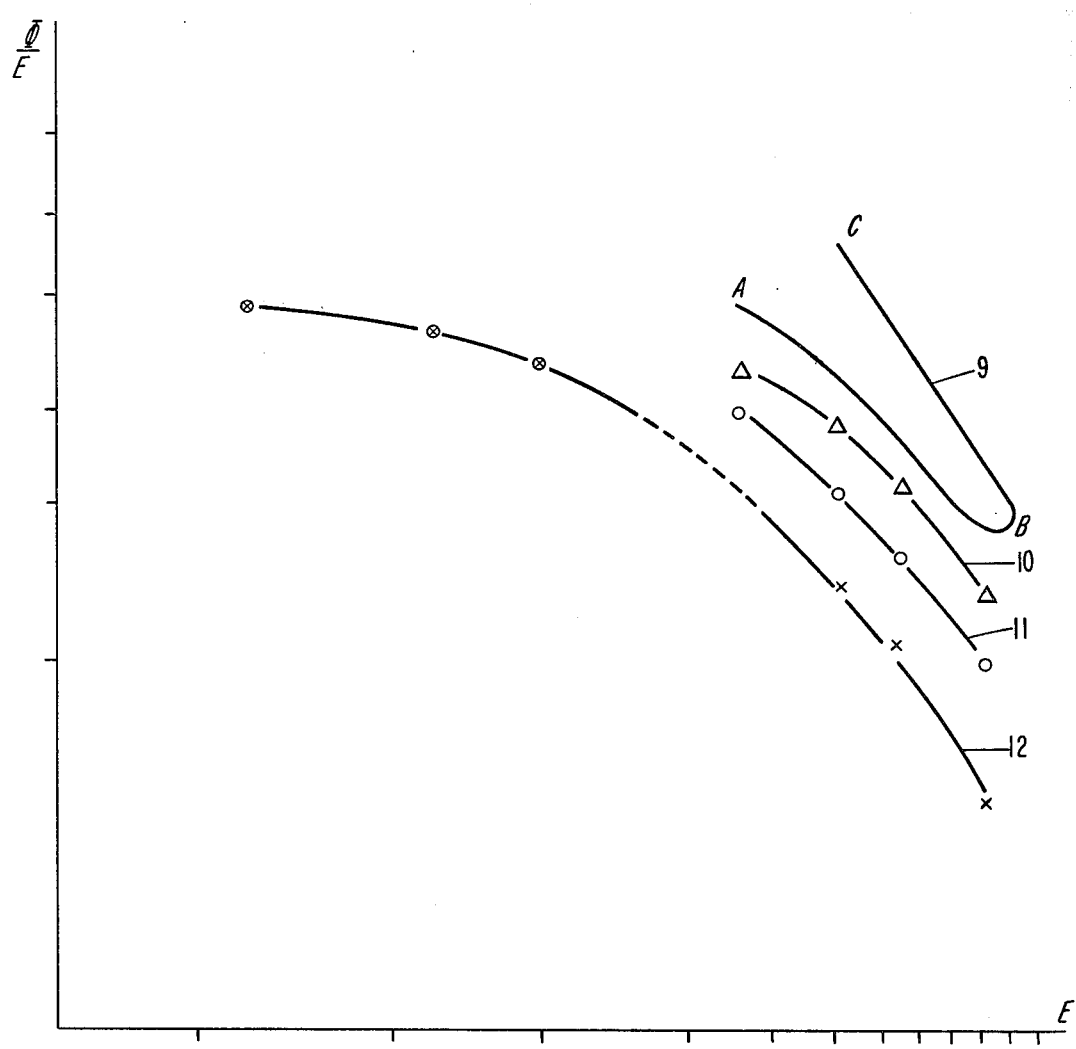

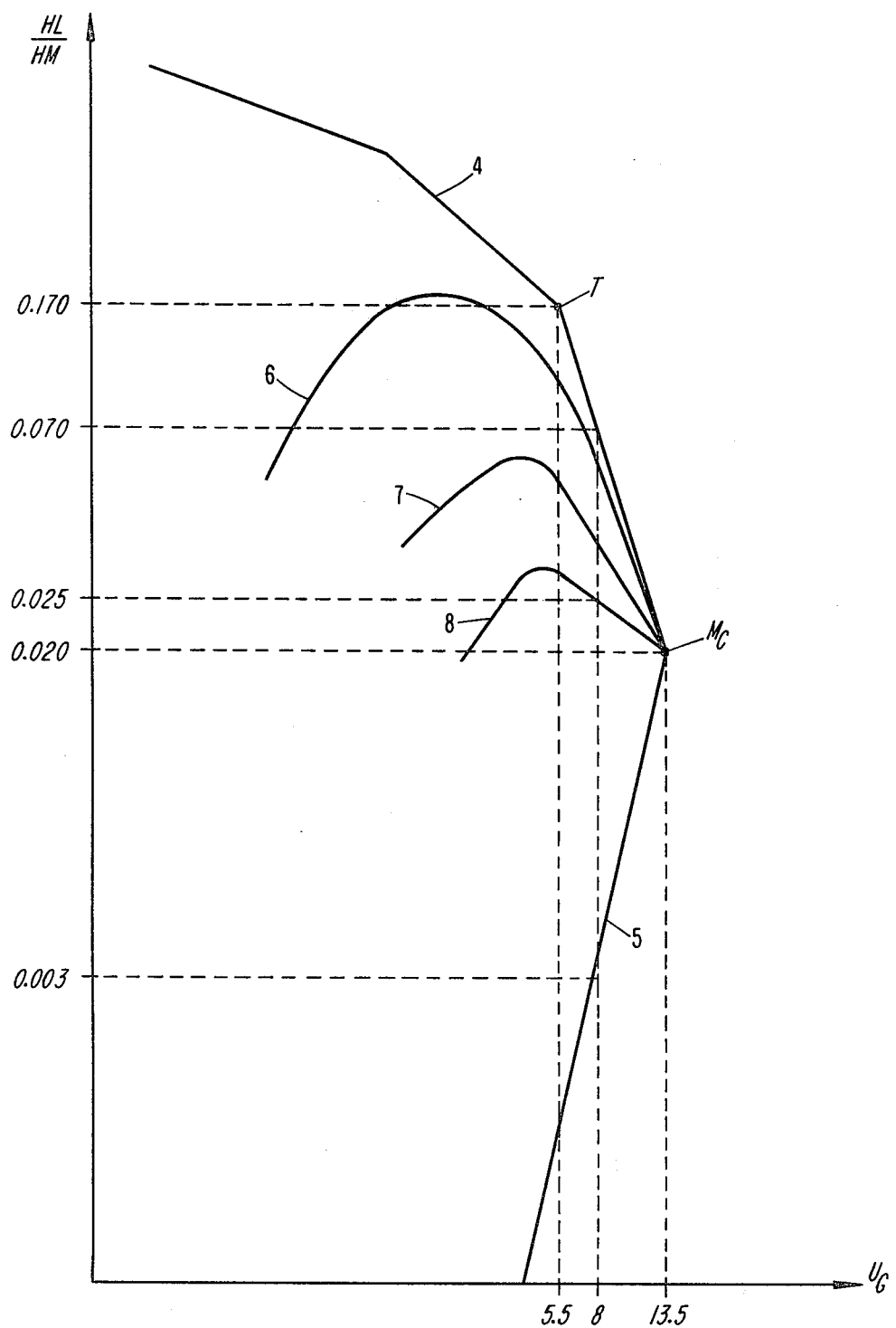

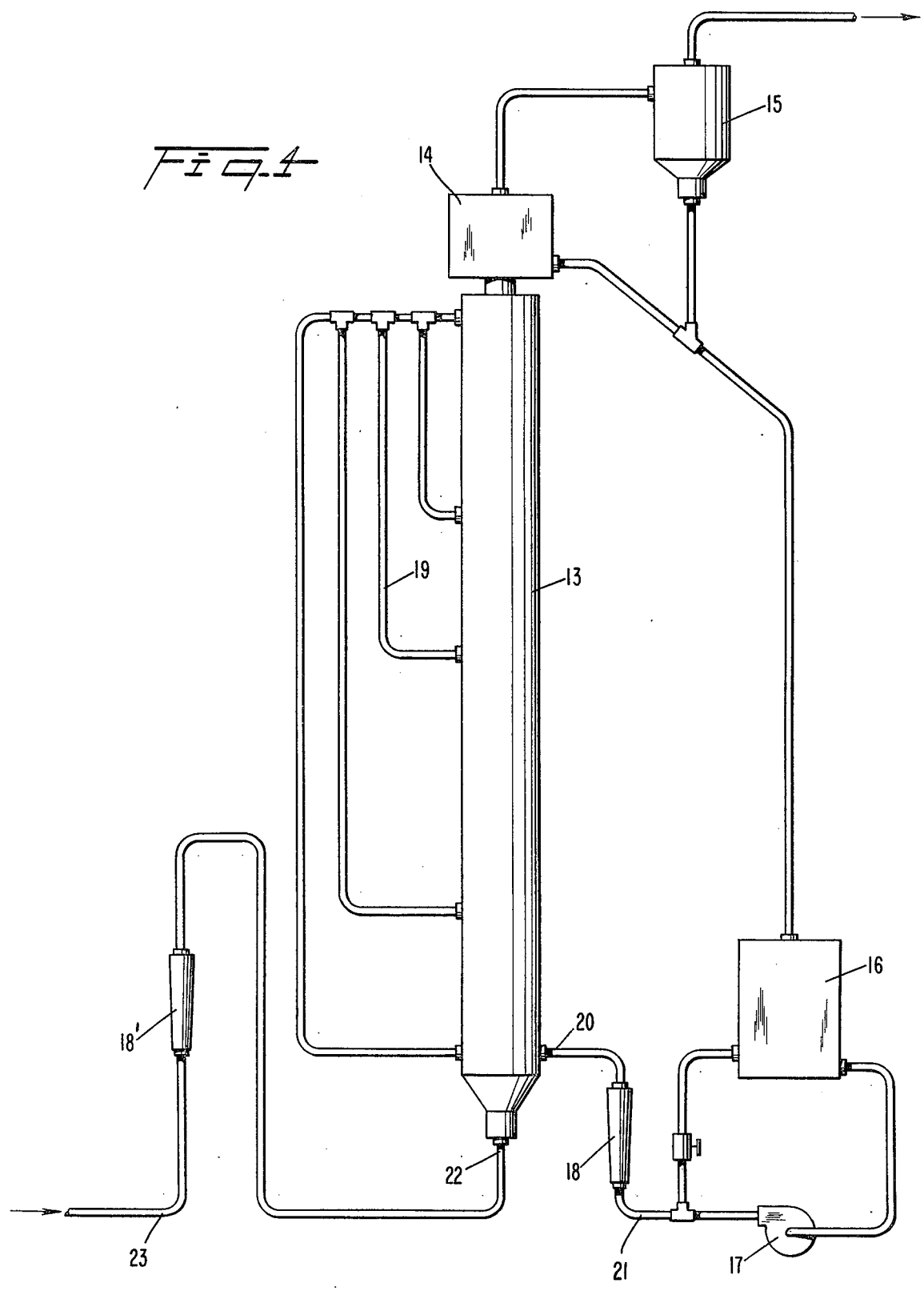

CONTACTING OF PLURAL PHASES

CROSS-REFERENCE TO RELATED APPLICATION

This application is a continuation of our copending application, Ser. No. 060,889, filed July 26, 1979, now abandoned, hereby expressly incorporated by reference in its entirety and relied upon.

BACKGROUND OF THE INVENTION

1. Field of the Invention

The present invention relates to the intimate contacting of a plurality of distinct physical phases and a contactor thereof. More particularly, the invention relates to an improved method for contacting a gas and a liquid by introducing the gas at a velocity exceeding its phase transition inversion velocity.

2. Description of the Prior Art

Draught tube type contactors comprising a column to which a liquid and gas are cocurrently supplied have long been known to the prior art. Reactors or contactors of this type are generally designated as a bubble column due to the bubbling of the gas through the liquid. Certain disadvantages in using a bubble column however, have limited the application of such columns due to the reduction in efficiency and effectiveness of contact in the column resulting therefrom. For example, large volumes of liquid are generally required relative to the amount and rate of gas flow through the column. For certain chemical reactions, the mixed flow of liquid in a bubble column may result in undesirable secondary reactions, which translates into a loss of raw materails and energy. Additionally, under certain operating conditions, e.g., under pressure, the formation of vesicles can be observed.

All of the aforementioned disadvantages, upon consideration thereof, limit the possible applications of draught tube type reactors or bubble columns by rendering them, if not unsuitable, nonetheless poorly adapted, for certain types of contact, despite the contactors apparent simplicity of structure and function.

Accordingly, it is an object of the present invention to provide a method for contacting two physically disparate phases, such as a gas and a liquid, with improved efficiency and effectiveness.

Another object of the present invention is to provide a method of contacting two physically disparate phases which is not limited in its application by the aforenoted disadvantages.

Other objects, features and advantages will become apparent to those skilled in the art upon a study of this disclosure, the drawings, and the appended claims.

SUMMARY OF THE INVENTION

It has now been surprisingly discovered that more effective and efficient intimate contacting of a plurality of disparate phases that are cocurrently introduced into a contacting column can occur if (i) a first phase, e.g., a gaseous phase, is introduced at a velocity between its phase transition inversion point (T) and multiple critical point ($M_c$) velocities, which velocity is sufficient to create a dispersion of the second phase, e.g., liquid, in the gas and thus establish at most the following zones, from bottom to top, in the column: a bottom zone of constant liquid concentration designated the emulsion zone, a zone of decreasing liquid concentration, and a third zone of constant liquid concentration wherein the liquid exists in the form of droplets; and, (ii) the feed velocity of said liquid phase is sufficient to provide a mass liquid concentration, i.e., the volume of liquid per unit volume of the contactor, in the emulsion zone that is between its corresponding mass liquid concentration phase transition inversion point and multiple critical point values.

BRIEF DESCRIPTION OF THE DRAWINGS

FIG. 1 is a graphic representation of the operation of a contacting column wherein the height (H) of the column is plotted against the value $H_m/H_L$, i.e., the ratio of the height of emulsion and the height of clear liquid at zero gas holdup between two pressure tappings.

FIG. 2 is a graphic representation of the operation of a contacting column obtained by plotting the gas velocity ($U_G$) against the value $H_L/H_m$, which represents the ratio of the height of liquid at zero gas holdup and height of emulsion between two pressure tappings. Said value $H_L/H_m$ also corresponds to the liquid holdup at same point in the contactor.

FIG. 3, is a graphic representation of the efficiency of a gas-liquid contactor.

FIG. 4, is a schematic representation of a contacting column useful in the process of the present invention.

DETAILED DESCRIPTION OF THE INVENTION

The present invention relates to an improved process for the intimate contacting of plural, physically disparate phases in bubble column type contactors. It has been effectively demonstrated through extensive work by the applicants that in a bubble column, the gas holdup ($\epsilon_G$), i.e., the volume of gas present per unit volume of contactor or, that fraction of the volume of a plural phase mixture occupied by gas, exhibits four types of behavior for a given liquid feed velocity as a function of the gas feed velocity. Namely:

(i) at low gas velocities, the column behaves in a conventional manner, i.e., a dispersion of the gas in the liquid is established;
(ii) at slightly higher gas velocities, the medium becomes highly turbulant with the formation of coarse bubbles and projections of the liquid in the form of coarse droplets;
(iii) at still higher gas velocities, a dispersion of the liquid in the gas develops and various zones of varying liquid and gas concentrations are established in the column; and,
(iv) finally, beginning at a certain gas velocity, a liquid loss is experienced due to entrainment of the liquid in the gas thus requiring compensation for said loss of liquid by entrainment. For gas velocities which produce the third type of behavior, i.e., the formation of a dispersion of liquid in the gas and the establishment of various zones of concentration in the column, it has further been demonstrated that at most three zones are established and which comprise, from bottom to top, in the column:

(a) a zone of constant liquid concentration designated hereinafter as the emulsion zone,
(b) a zone wherein the concentration of the liquid decreases with increasing height of the column, hereinafter designated the vesiculation zone; and,
(c) a zone wherein the liquid concentration is again constant, yet less than that in the emulsion zone, and where the liquid is present in the form of small droplets, this zone to be designated hereinafter as the zone of entrainment.

These three zones are graphically represented in FIG. 1 by plotting the height of the column H on the ordinate and the value $H_m/H_L$, the ratio of the height of the emulsion and the liquid at zero gas holdup (i.e., when $\epsilon_G$ equals zero), on the abcissa. The value $H_m/H_L$ is also equivalent to the value $1/(1-\epsilon_G)$, which is equal to $1/\epsilon_L$ with $\epsilon_L$ being the liquid holdup value, i.e., the volume of liquid present per unit volume contact or, that fraction of the volume of the plural phase mixture occupied by liquid at a given point in the contactor.

In FIG. 1, the three curves, 1–3, represent the three zones over the height of the feed of the contacting column. Curve 1 represents the emulsion zone, wherein $H_m/H_L$ is constant over a certain column height termed the "true emulsion height". Up to this height, the flow configuration is constant, and thus the gas holdup $\epsilon_G$ and liquid holdup $\epsilon_L$ are constant.

Curve 2 represents the second zone wherein the liquid concentration decreases and the plural phase mixture becomes increasingly richer in gas. Accordingly, $H_m/H_L$ increases with the height of the column.

Curve 3 represents the zone of entrainment wherein the liquid holdup and gas holdup are again constant, but, the liquid is present in the form of small droplets and the concentration or liquid holdup value therein has decreased with respect to the emulsion zone liquid concentration.

Moreover, the existance of two critical gas velocities has been discovered between which the aforedescribed phenomenum occurs with increased efficiency and effectiveness of gas-liquid contact in the column. The two gas velocities are (i) the phase inversion transition point velocity T, at which velocity, and at increasing velocities, the liquid becomes dispersed in the gas and the corresponding aforedescribed zones are established; and, (ii) the multiple critical point velocity $M_c$, which delimits the maximum gas velocity appropriate for effective and efficient contacting and beyond which compensation for the loss of liquid by entrainment becomes necessary. If the feed gas velocity is maintained between these two points, and a liquid phase is introduced with a velocity sufficient to provide a mass liquid concentration in the emulsion zone between its corresponding phase inversion transition point and multiple critical point values, a major improvement in the efficiency and effectiveness of the intimate contacting of the plural, physically disparate phases is realized. Reference to FIG. 2 will aid in illustrating the phase inversion transition point and multiple critical point velocities of the gas and corresponding liquid holdup values.

In FIG. 2, there is graphically represented an operation of a contacting column by plotting the gas velocity $U_G$ in meters per second on the abcissa and the value of $H_L/H_m$ on the ordinate. $H_L/H_m$ represents the volume of liquid per unit volume of the contactor at any given point of the contactor and is equivalent to the liquid holdup $\epsilon_L$ value at said point. The values shown in the graphical representation of FIG. 2 is on a logarithmic scale.

The contacting operation depicted is that of an air-water system in a bubble column type contactor having a column diameter of about 75 milimeters and a height of about 4.3 meters. The contacting assembly is defined by a system of five curves. Curve 4 defines the emulsion zone, Curve 5 the zone of entrainment, and Curves 6, 7, and 8 represent the concentration in the vesiculation zone at 0.1, 0.3, and 0.5 meters respectively, from the top of the emulsion zone. Curves 6, 7, and 8, therefore, are characteristic of the rate of decline of liquid concentration in the vesiculation zone upon moving away from the top of the emulsion zone.

The system of curves converge toward a single point $M_c$, which is termed the multiple critical point. When the gas velocity is increased beyond said point, i.e., a gas velocity greater than 13.5 meters per second, an increased entrainment of the liquid in the gas is obtained which increases the necessity to compensate the loss of liquid by entrainment. Similarly, it is to be noted that Curve 4 in FIG. 2 has two transition points, the second of which is labeled T and is the phase inversion transition point. Beginning at this point, i.e., which corresponds to a gas velocity of about 5.5 meters per second, and at increasing velocities of the gas, the liquid becomes dispersed in the gas and improved intimate contact of the plural disparate phases is observed, as long as the gas velocity does not exceed that of the multiple critical point velocity. Thus, it is critical that the gas feed velocity lie between these two points, above the phase inversion transition point velocity, but not exceeding the multiple critical point velocity.

The corresponding inversion transition point T and mutiple critical point $M_c$ liquid holdup values in the emulsion zone can also be determined from FIG. 2. The corresponding phase inversion transition point T liquid holdup in the emulsion zone, which value corresponds to the $H_L/H_m$ value on the ordinate for point T on Curve 4, is about 0.170. Similarly, the corresponding multiple critical point $M_c$ liquid holdup in the emulsion is 0.020. It should be noted that multiplication of the liquid holdup value for a given point in a contactor by the density of the liquid gives the mass liquid concentration at said point. For example, given a gas velocity of 8 m/sec. and a liquid velocity of 0.20 m/sec., the mass liquid concentration 0.5 m from the top of the emulsion zone can be obtained by multiplying 0.025, the value of $H_L/H_m$ on Curve 8 for a gas velocity of 8 m/sec., by the density of the liquid. In the case of water, the mass liquid concentration would be 25 Kg/m$^3$. Given the same gas velocity, the mass liquid concentration in the emulsion zone would be 70 Kg/m$^3$.

If, instead of $H_L/H_m=0.025$, $H_L/H_m=0.070$, the column would necessarily be totally filled with emulsion. If the $H_L/H_m$ value is greater than 0.070, the emulsion would continue to densify under the effect of the liquid flow. If, however, the $H_L/H_m$ value was less than 0.003, corresponding to the entrainment curve (Curve 5) value for 8 m/sec $U_G$, the column would be practically empty due to loss of liquid via entrainment thereof.

In order to further illustrate the present invention and the advantages thereof, the following specific examples are given, it being understood that same are intended only as illustrative and in nowise limitative.

The following example demonstrates the efficiency of the intimate contacting of plural phases in accordance with the present invention. In the example, sodium sulfite was oxidatively reacted in air in the presence of a cobalt catalyst. The contactor employed for the reaction is shown in FIG. 4. It comprises a contacting column 13 surmounted by a primary separator 14, which is employed to separate any entrained liquid from the gas. A cyclone 15 is also employed for the same purpose. The separated liquid is then returned to a storage tank 16 for said liquid which is sampled periodically to check the evolution of the sulphite concentration. The liquid feed to the contactor column 13 is introduced at 20 as the liquid is taken from the tank 16 and pumped via pump 17 and line 21 through flow meter 18 to the column.

The gas feed to the column 13 enters at the bottom 22 of the column via conduit 23. The gas velocity is measured by flow meter 18'. Differential pressure manometer tappings 19 are provided for the column in order to determine the gas holdup ($\epsilon_G$) and liquid holdup ($\epsilon_L$) at various points of the contactor by means of differential pressure measurements.

The frequency and positioning of the manometer tappings can vary greatly, and, of course, will depend upon the dimensions of the column, the predetermined locations at which the pressure is to be measured and ones particular need and/or desire for accuracy, with the more accurate liquid and/or gas holdup measurements being desired, the greater the number of tappings which should be employed. Generally, one manometer tapping every 0.1 to about 0.5 meter, and more preferably, every 0.1 to about 0.2 meters, is sufficient, e.g., 24 pressure tappings over a column length of 3.2 m. The liquid holdup $\epsilon_L$ equals $H_L/H_m = (1 - \epsilon_G)$.

EXAMPLE 40 liters of an aqueous solution containing 100 grams per liter of sodium sulphite is introduced into a contacting column. The height of the column is 4.3 meters and its diameter 75 millimeters. This is followed by the introduction of a gaseous phase, i.e., air. The gaseous phase velocity $U_G$ was varied over a wide range of velocities for each of four different liquid feed velocities $U_L$. The four liquid velocities were 0.2 meters per second, 0.12 meters per second, 0.05 meters per second, and 0.005 meters per second. The hourly consumption of the sulphite was derived by monitoring the recovered liquid phase. The results are represented graphically in FIG. 3.

In FIG. 3, the power dissipated per m³ of the apparatus hereinafter designated, E, is plotted in KW/m³, and the transfer flux $\Phi$ between phases measured per KW applied is shown on the ordinate by $\Phi/E$. Accordingly, each of the curves 9, 10, 11, and 12 thus represents the variation of $\Phi/E$ as a function of E, the variation of E being obtained by keeping $U_L$ constant and varying $U_G$. Curve 9 represents the reaction wherein a liquid velocity was 0.2 meters per second, curve 10 wherein the liquid velocity was 0.12 meters per second, curve 11 wherein the liquid velocity was 0.05 meters per second, and curve 12 wherein the liquid velocity was 0.005 meters per second.

Generally, upon neglecting the terms relative to the kinetic energies of the fluids at their entry into the contactor, the power dissipated $E = \rho g(U_G + U_L)$ with $\rho$ being the average density of the dispersion present in the contactor. In the example, the power dissipated per unit volume of the contactor was determined with the velocity of the liquid and gas, $U_L$ and $U_G$ respectfully, calculated as if the column was empty.

The performance of an apparatus, i.e., the efficiency and effectiveness of the contacting within a contactor, improves with increasing phase contact for a given volume and with decreasing energy dissipation for the same level of contact. Thus, in FIG. 3, the higher the value of the ordinate, the better the gas liquid contact for a given value of energy dissipated. Also, the higher the value of the abcissa with a constant ordinate, the smaller the size of the apparatus necessary for the level of contact. Consequently, the quality of a contacting within a contactor as determined by the diagram in FIG. 3 improves as the operation point moves to the right (increasing abcissa) and upwardly (increasing ordinate).

For columns of the type known to the prior art, so called bubble columns which operate with a gas velocity such that the gas is dispersed in the liquid, the level of contact generally decreases with increasing gas velocities. With respect to the data obtained from the example, it is noted that for Curves 10, 11, and 12, the function $\Phi/E$ continuously decreases, which is behavior similar to that of a conventional bubble column. However, Curve 9, pertaining to a liquid velocity of 0.2 meters per second, shows a decrease in the function $\Phi/E$ with E increasing for gas velocities less than or equal to 5.5 meters per second (portion AB of the curve); but, at gas velocity values between 5.5 meters per second and 10 meters per second (portion BC of the curve), the energy dissipated decreases as $\Phi/E$ increases, which indicates that the level of contact surprisingly increases with the velocity of the gas.

Moreover, if a liquid velocity equal to about 0.2 meters per second and a gas velocity equal to about 0.1 meters per second are employed, corresponding to an operation outside the scope of the invention, the transfer flux $\Phi$ is 300 m³/hour per m³ of the contactor. A liquid velocity of about 0.2 meters per second and a gas velocity of about 8 meters per second, however, will provide a transfer flux $\Phi$ of about 2,000 m³/hour per m³ of contactor. Yet, the energy dissipated in both of these cases is equal to about 0.25 kilowatts for a transfer flux of about 100 m³ per hour. In other words, working with a column with liquid droplets transported in a gas as compared to a gas dispersed in a liquid makes it possible to decrease the volume of the contactor essentially by a factor of 7 without increasing the energy consumption for a constant amount of work. Hence, smaller columns can be employed due to the more efficient and effective contacting. Furthermore, it has been observed that the flow of the liquid maybe considered as approaching at least three-quarter flow of the slug type, which is not true for normal bubble columns according to the prior art, which as mentioned hereinabove, are of the agitated reactor type.

Thus, the aforementioned advantages are obtained by the process of the present invention by employing a gas velocity $U_G$ (measured relative to air at atmospheric pressure and ambient temperature) which exceeds the phase inversion point velocity of 5.5 m/sec, i.e., where the liquid becomes a dispersion in the gas instead of the gas being dispersed in the liquid, but does not exceed the multiple critical point velocity of about 13.5 m/sec; and, a liquid velocity is employed which provides a liquid holdup in the emulsion zone for said gas velocity which is between its corresponding phase inversion transition point and multiple critical point values, i.e., 0.170 and 0.020 respectively. Moreover, it has been observed that the values of the phase transition inversion point T and the multiple critical point $M_c$ vary little as a function of surface tension and liquid viscosity.

Accordingly, the process of the present invention is, indeed, generally applicable to all cases where a gaseous phase is treated with a liquid, and more particularly, where a large volume of gas is to be treated at high velocities with a small amount of liquid, e.g., such as the treatment of gaseous effluent of chemical and parachemical industries. In this respect, the following calculated examples pertaining to a nitric acid plant producing 350 tons per day of nitric acid and a sulfuric acid plant producing 500 tons per day of sulfuric acid should be considered.

Nitric Acid Plant:

The gaseous flow to be treated amounts to 52,000 $Nm^3/h$ containing x vpm of $NO_x$. Operating conditions are as follows:

Pressure: 4 bars
Ambient temperature
Height of column: 10 meters
$U_G$: four meters per second under 4 bars, corresponding to eight meters per second if operating under atmospheric pressure,
$U_L$: 0.2 meters per second corresponding to a liquid holdup in the emulsion zone of 0.070, or a liquid mass concentration in the emulsion zone of about 70 $Kg/m^3$.

If the absorption of $NO_x$ is effected by means of a 1 N nitric acid solution free of NO, $NO_2$, $N_2O_3$, $N_2O_4$ and $HNO_2$, the $NO_x$ content of the gases may be reduced from 6500 to 400 vpm with an absorption yield of 80 percent by operating under the aforementioned conditions.

Sulfuric Acid Plant:

The gaseous flow to be treated amounts to 70,000 $Nm^3/h$ containing 0.1 percent $SO_2$. If the following operating conditions are observed:

Atmospheric pressure
Ambient temperature
Absorption of $SO_2$ by means of a 2N sodium hydroxide solution
Column of ten meters in height with an internal diameter 1.76 meters
$U_G$ equal to 8 m/sec
$U_L$ equal to 0.2 m/sec corresponding to a liquid holdup of 0.070 in the emulsion zone, or a liquid content in the emulsion zone of about 70 $kg/m^3$,
a purification yield of more than 99.99% is possible.

Additionally, gases originating in the manufacture of various acids, such as $H_2S$, HCl, HF or different combustion gas products can be treated in accordance with the present invention. The invention, however, equally applies to chemical reactions such as the carbonation of sodium hydroxide with bases having a low $CO_2$ content, or in the case where it is necessary to employ a solid catalyst in relatively rapid reactions involving gas-liquid contact. The process of the present invention is also applicable to instances wherein a large amount of a liquid is to be treated in a closed circuit, two immiscible liquids are to be treated, a suspension is to be treated, or a gas is to be treated for the removal of dust.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed:

1. In a process for the contacting of a gaseous phase with a liquid phase by cocurrently introducing the plural, physically disparate phases into a contactor, the improvement comprising
   (i) introducing the gaseous phase at a velocity which exceeds its phase transition inversion velocity and is thereby sufficient to create a dispersion of the liquid phase in the gas and establish at most the following zones, from bottom to top, in the column:
      (a) an emulsion zone of constant liquid concentration,
      (b) an intermediate zone of decreasing liquid concentration, and
      (c) a zone of constant liquid concentration wherein the liquid concentration is less than that in the emulsion zone,
   but wherein said velocity is less than its multiple critical point velocity; and,
   (ii) introducing the liquid phase at a velocity sufficient to establish a mass liquid concentration in the emulsion zone which is between its corresponding phase transition inversion point and multiple critical point values.

2. The process as defined by claim 1 wherein said gas velocity is between 5.5 meters per second and 13.5 meters per second and the mass liquid concentration is between 170 and 20 $kg/m^3$.

3. The process defined by claim 1 wherein said liquid phase is an aqueous phase and the mass liquid concentration in the emulsion zone is between 170 and 20 $Kg/m^3$.

4. The process of claim 1, 2 or 3 wherein the gaseous phase comprises nitrogen oxides.

5. The process of claim 1, 2 or 3 wherein the gaseous phase comprises $SO_2$.

6. The process of claim 1, 2 or 3 wherein a carbonation reaction is effected by contacting an aqueous sodium hydroxide solution with a carbon dioxide gaseous phase.

7. The process of claim 1 or 2 wherein a solid catalyst is carried in said liquid phase.

8. The process of claim 1 or 2 wherein solid materials are suspended in the liquid phase.

9. The process of claim 1 or 2 wherein the gaseous phase is dust laden and the liquid phase is contacted with the gaseous phase to thereby remove the dust from said gas.

10. The process of claim 1 or 2 wherein the liquid phase comprises two immiscible liquids which are contacted with said gaseous phase.

* * * * *